(12) United States Patent
Su et al.

(10) Patent No.: US 11,606,305 B2
(45) Date of Patent: Mar. 14, 2023

(54) QUALITY OF SERVICE ADJUSTING METHOD BASED ON APPLICATION CATEGORIES AND SYSTEM THEREOF

(71) Applicant: Wistron NeWeb Corporation, Hsinchu (TW)

(72) Inventors: Li-Heng Su, Hsinchu (TW); Chuan-Yuan Tseng, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 104 days.

(21) Appl. No.: 17/386,651

(22) Filed: Jul. 28, 2021

(65) Prior Publication Data

US 2022/0166725 A1     May 26, 2022

(30) Foreign Application Priority Data

Nov. 24, 2020 (TW) ................................ 109141198

(51) Int. Cl.
| | |
|---|---|
| *H04L 47/00* | (2022.01) |
| *H04L 47/2483* | (2022.01) |
| *H04L 47/6275* | (2022.01) |
| *H04L 47/2425* | (2022.01) |
| *H04L 47/783* | (2022.01) |

(52) U.S. Cl.
CPC ...... *H04L 47/2483* (2013.01); *H04L 47/2433* (2013.01); *H04L 47/6275* (2013.01); *H04L 47/783* (2013.01)

(58) Field of Classification Search
None
See application file for complete search history.

(56) References Cited

U.S. PATENT DOCUMENTS

| | | | |
|---|---|---|---|
| 8,369,334 B2 | 2/2013 | Yu | |
| 11,234,254 B2 | 1/2022 | Hareuveni et al. | |
| 2013/0100955 A1* | 4/2013 | Dunlap | H04L 47/76 370/392 |
| 2013/0336115 A1* | 12/2013 | Subramaniam | H04L 47/125 370/235 |

(Continued)

FOREIGN PATENT DOCUMENTS

| | | | |
|---|---|---|---|
| CN | 101771627 A | 7/2010 | |
| TW | 202127850 A | 7/2021 | |
| WO | WO-2016156014 A1 * | 10/2016 | ......... H04L 43/0864 |

*Primary Examiner* — Gerald A Smarth
(74) *Attorney, Agent, or Firm* — McClure, Qualey & Rodack, LLP (57) ABSTRACT

A quality of service adjusting method based on application categories is configured to adjust a Quality of Service (QoS) of a communication device. A network session processing step is performed to drive a hardware accelerator to process a plurality of network sessions. A packet receiving step is performed to drive a processing unit to receive a first packet group of each of the network sessions. A packet analyzing step is performed to execute a packet inspecting module to analyze a plurality of packet data of the first packet group of each of the network sessions, and to classify an application corresponding to each of the network sessions. A list establishing step is performed to establish a priority list. A bandwidth distributing step is performed to distribute a network bandwidth to a second packet group of each of the network sessions according to the priority list.

16 Claims, 7 Drawing Sheets

(56) References Cited

U.S. PATENT DOCUMENTS

| | | | |
|---|---|---|---|
| 2014/0313989 A1* | 10/2014 | Doken | H04N 21/64769 |
| | | | 370/329 |
| 2017/0093739 A1* | 3/2017 | Kitada | H04L 47/621 |
| 2018/0048589 A1 | 2/2018 | Kulkarni | |
| 2018/0131613 A1* | 5/2018 | Fraser | H04L 47/27 |
| 2019/0327624 A1 | 10/2019 | Raleigh | |
| 2020/0374336 A1 | 11/2020 | Murgia | |

* cited by examiner

QUALITY OF SERVICE ADJUSTING METHOD BASED ON APPLICATION CATEGORIES AND SYSTEM THEREOF

RELATED APPLICATIONS

This application claims priority to Taiwan Application Serial Number 109141198, filed Nov. 24, 2020, which is herein incorporated by reference.

BACKGROUND

Technical Field

The present disclosure relates to a quality of service adjusting method and a system thereof. More particularly, the present disclosure relates to a quality of service adjusting method based on a plurality of application categories and a system thereof.

Description of Related Art

In recent years, demands of people for leisure and entertainment have gradually increased with the improvement of quality of life. The information transmitted on Internet is no longer only text and pictures, and demands for multimedia audio-visual information are increasing. Network bandwidth is the medium used by users to rent network packets from telecommunications companies. With the prevalence of e-sports and the popularity of 4K video streaming platforms on Internet, various network application services occupy the network bandwidth, and cause the applications to compete with each other for network resources.

The prior router has the function of Quality of Service (QoS). The setting of QoS of the prior router relies on users to manually select the network application services that need to be optimized. However, the most users can not set the advanced options of the network application services. In addition, the prior router is equipped with a hardware accelerator provided by the chip vendor. The network packets can pass through routers faster by the hardware accelerator. However, the hardware accelerator does not have the classification function of QoS. When the hardware accelerator needs to transmit a plurality of network sessions of multiple applications, the network packets can still be congested on the router. Therefore, if the hardware accelerator is not properly managed, both of the hardware accelerator and network resources can cause unnecessary waste. More importantly, the aforementioned problems can also reduce the advantage of the hardware accelerator used in network acceleration and form another kind of network traffic.

In view of this, the current market lacks a quality of service adjusting method and a system thereof which can adjust a priority of the hardware accelerator and become the goal and the direction of relevant industry efforts.

SUMMARY

According to one aspect of the present disclosure, a quality of service adjusting method based on a plurality of application categories is configured to adjust a Quality of Service (QoS) of a communication device. The quality of service adjusting method based on the application categories includes performing a network session processing step, a packet receiving step, a packet analyzing step, a list establishing step and a bandwidth distributing step. The network session processing step is performed to drive a hardware accelerator to process a plurality of network sessions, so that the network sessions pass through the communication device. A plurality of network packets of each of the network sessions are grouped into a first packet group and a second packet group. The communication device includes a processing unit. The packet receiving step is performed to drive the processing unit to receive the first packet group of each of the network sessions. The second packet group is arranged after the first packet group. Each of the network packets has a packet datum. The packet analyzing step is performed to drive the processing unit to execute a packet inspecting module. The packet inspecting module analyzes a plurality of the packet data of the first packet group of each of the network sessions and classifies an application corresponding to each of the network sessions. The list establishing step is performed to drive the processing unit to establish a priority list corresponding to a plurality of the applications. The bandwidth distributing step is performed to drive the hardware accelerator to distribute a network bandwidth of the communication device to the second packet group of each of the network sessions according to the priority list so as to adjust the QoS of the communication device. The second packet group of one of the network sessions corresponding to one of the applications having a higher priority has a larger network bandwidth.

According to another aspect of the present disclosure, a quality of service adjusting system based on a plurality of application categories is configured to adjust a Quality of Service (QoS) of a communication device. The quality of service adjusting system based on the application categories includes a communication device. The communication device receives a plurality of network sessions, and a plurality of network packets of each of the network sessions are grouped into a first packet group and a second packet group. The communication device includes a memory, a processing unit and a hardware accelerator. The memory is configured to access a packet inspecting module. The processing unit is electrically connected to the memory and configured to implement a quality of service adjusting method based on the application categories including performing a packet receiving step, a packet analyzing step and a list establishing step. The packet receiving step is performed to drive the processing unit to receive the first packet group of each of the network sessions. The second packet group is arranged after the first packet group. Each of the network packets has a packet datum. The packet analyzing step is performed to drive the processing unit to execute the packet inspecting module. The packet inspecting module analyzes a plurality of the packet data of the first packet group of each of the network sessions and classifies an application corresponding to each of the network sessions. The list establishing step is performed to drive the processing unit to establish a priority list corresponding to a plurality of the applications. The hardware accelerator is electrically connected to the processing unit and processes the network sessions, so that the network sessions pass through the communication device. The hardware accelerator distributes a network bandwidth of the communication device to the second packet group of each of the network sessions according to the priority list so as to adjust the QoS of the communication device. The second packet group of one of the network sessions corresponding to one of the applications having a higher priority has a larger network bandwidth.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
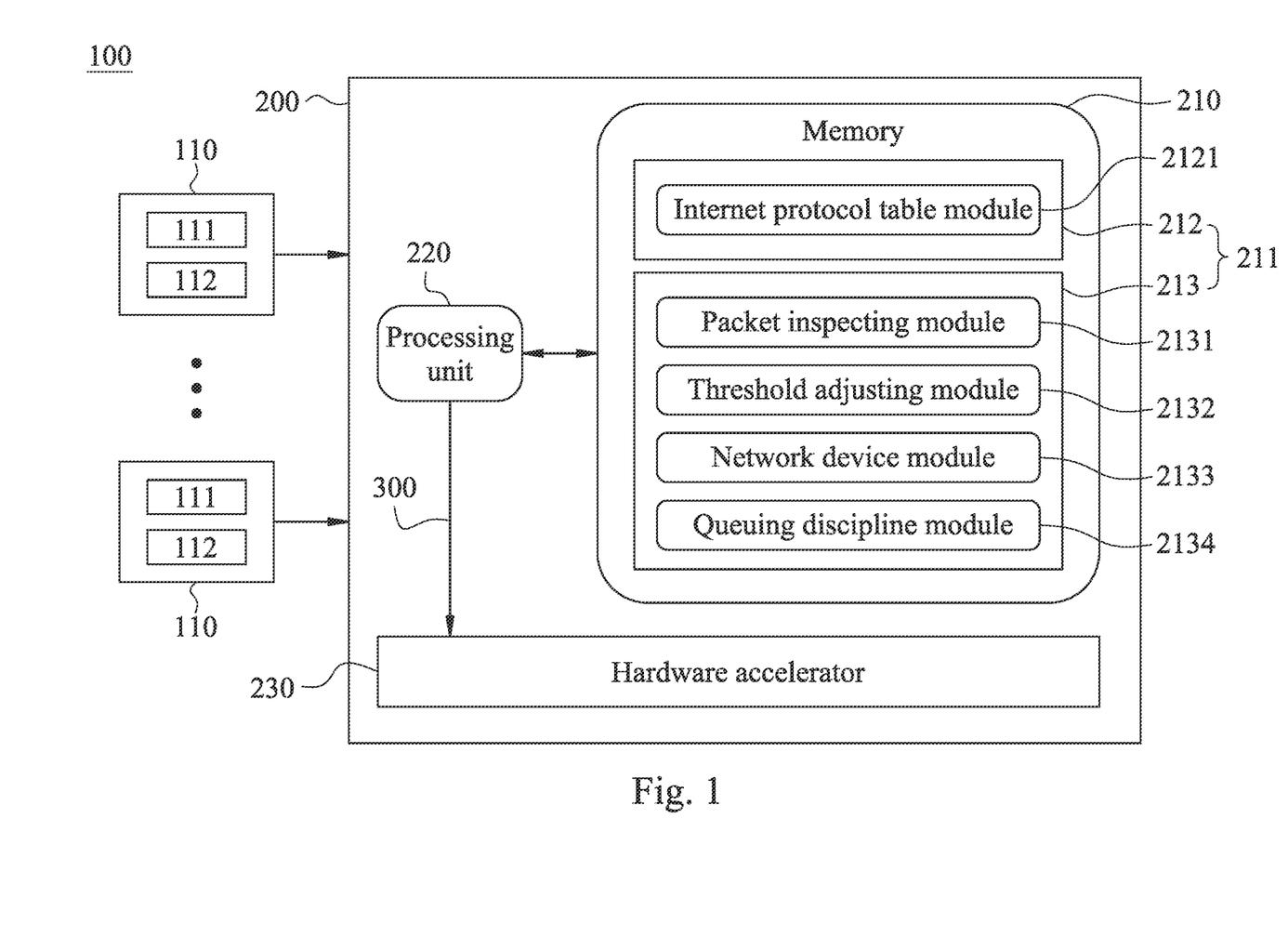
FIG. 1 shows a block diagram of a quality of service adjusting system based on a plurality of application categories according to the 1st embodiment of the present disclosure.
Figure 2:
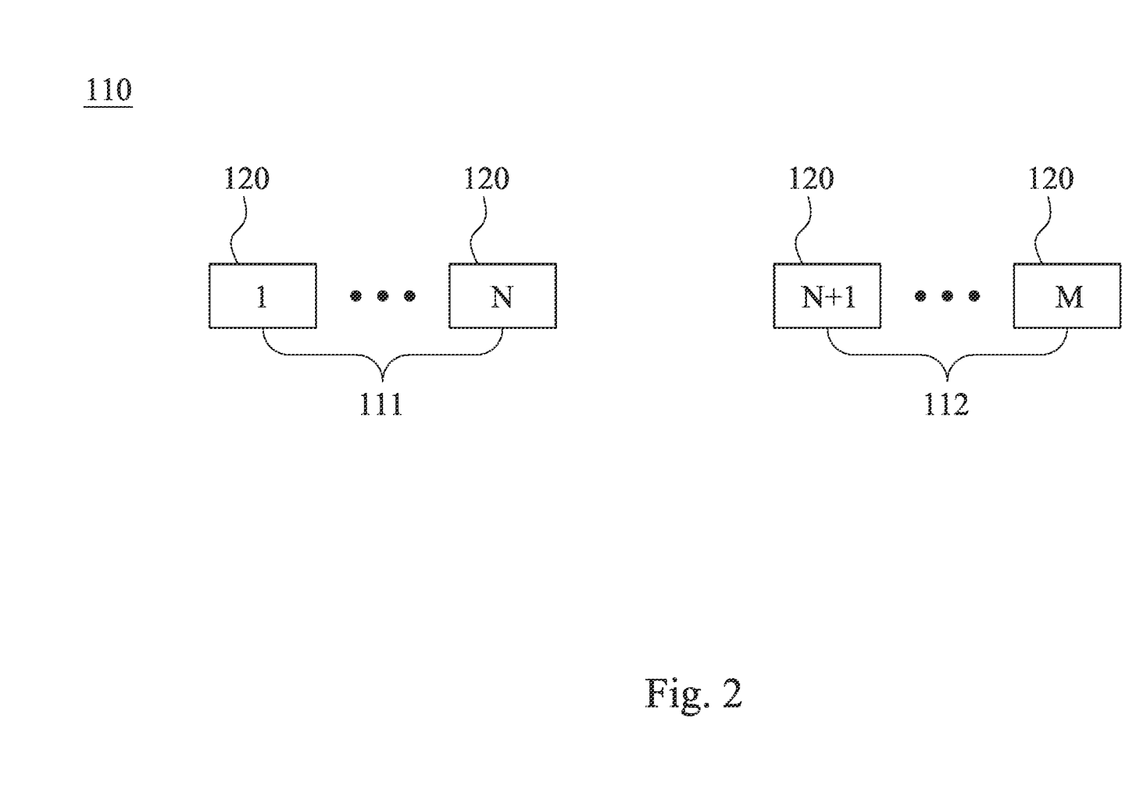
FIG. 2 shows a schematic view of a network session of FIG. 1.

Please refer to FIGS. 1 and 2. FIG. 1 shows a block diagram of a quality of service adjusting system 100 based on a plurality of application categories according to the 1st embodiment of the present disclosure. FIG. 2 shows a schematic view of a network session 110 of FIG. 1. In FIGS. 1 and 2, the quality of service adjusting system 100 based on the application categories is configured to adjust a Quality of Service (QoS) of a communication device 200. The quality of service adjusting system 100 based on the application categories includes the communication device 200. The communication device 200 can be a router or a telecommunication network device, and can receive and forward a plurality of the network sessions 110. Each of the network sessions 110 can transmit a plurality of network packets 120 in a communication service (e.g., sending an email), and the network packets 120 of each of the network sessions 110 are grouped into a first packet group 111 and a second packet group 112.

In addition, the communication device 200 includes a memory 210, a processing unit 220 and a hardware accelerator 230. An operating system program 211 is stored in the memory 210 and can be a Linux operating system. The operating system program 211 includes a user software module 212 and a kernel software module 213. The user software module 212 can be a user end of the Linux operating system, and the kernel software module 213 can be a kernel end (i.e., Linux Kernel) of the Linux operating system. Moreover, the processing unit 220 can be a Micro Processing Unit (MPU), a Central Processing Unit (CPU), a server processor or other arithmetic processors. The hardware accelerator 230 can be a Network Processing Unit (NPU), but the present disclosure is not limited thereto.

Further, the user software module 212 includes an internet protocol table module 2121, and the kernel software module 213 includes a packet inspecting module 2131, a threshold adjusting module 2132, a network device module 2133 and a queuing discipline module 2134, so that the memory 210 is configured to access the internet protocol table module 2121, the packet inspecting module 2131, the threshold adjusting module 2132, the network device module 2133 and the queuing discipline module 2134. The processing unit 220 is electrically connected to the memory 210 and configured to implement a packet receiving step, a packet analyzing step and a list establishing step. The packet receiving step is performed to drive the processing unit 220 to receive the first packet group 111 of each of the network sessions 110. The second packet group 112 is arranged after the first packet group 111. Each of the network packets 120 has a packet datum. The packet analyzing step is performed to drive the processing unit 220 to execute the packet inspecting module 2131. The packet inspecting module 2131 analyzes a plurality of the packet data of the first packet group 111 of each of the network sessions 110 and classifies an application corresponding to each of the network sessions 110. The list establishing step is performed to drive the processing unit 220 to establish a priority list 300 corresponding to a plurality of the applications. The hardware accelerator 230 is electrically connected to the processing unit 220 and processes the network sessions 110, so that the network sessions 110 passes through the communication device 200. The hardware accelerator 230 receives the priority list 300 from the processing unit 220 and distributes a network bandwidth of the communication device 200 to the second packet group 112 of each of the network sessions 110 according to the priority list 300 so as to adjust the QoS of the communication device 200. The second packet group 112 of one of the network sessions 110 corresponding to one of the applications having a higher priority has a larger network bandwidth.

In detail, each of the network sessions 110 can include M network packets 120. The 1st to the Nth network packets 120 are the first packet group 111. The N+1th to the Mth network packets 120 are the second packet group 112. N is greater than 1, and M is greater than N+1. A number of network packets 120 in the second packet group 112 is greater than a number of network packets 120 in the first packet group 111 (i.e., M−N>N). The processing unit 220 is configured to execute the operating system program 211. The processing unit 220 executes the internet protocol table module 2121 in the user software module 212 and executes the packet inspecting module 2131, the threshold adjusting module 2132, the network device module 2133 and the queuing discipline module 2134 in the kernel software module 213.

Therefore, the quality of service adjusting system 100 based on the application categories of the present disclosure uses the packet inspecting module 2131 to analyze the first packet group 111 of the network sessions 110 to establish the priority list 300, so that the second packet group 112 of one of the network sessions 110 having a high demand for immediacy in the hardware accelerator 230 obtains a high priority to use the network bandwidth of the communication device 200.

Figure 3:
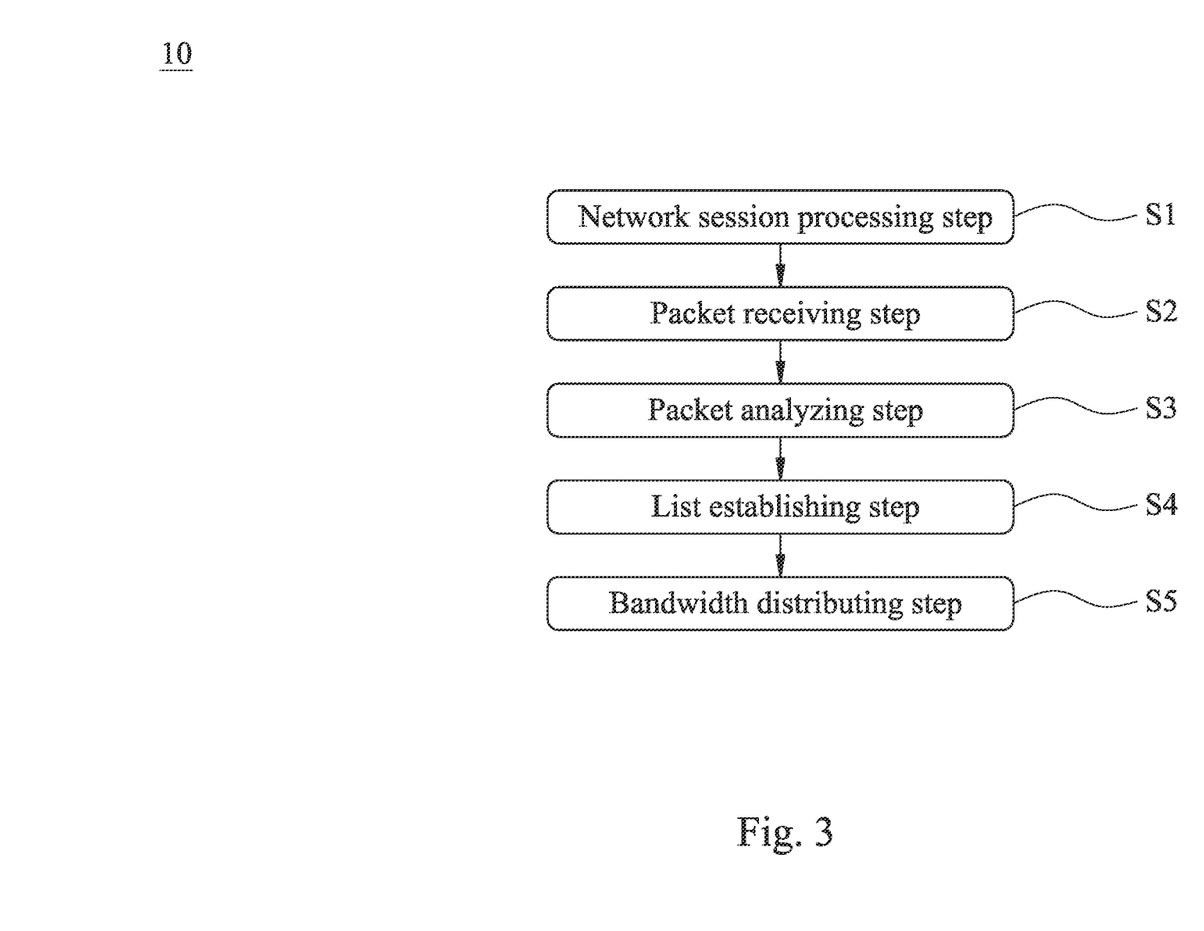
FIG. 3 shows a flow chart of a quality of service adjusting method based on a plurality of application categories according to the 2nd embodiment of the present disclosure.

Please refer to FIGS. 1 to 3, wherein FIG. 3 shows a flow chart of a quality of service adjusting method 10 based on the application categories according to the 2nd embodiment of the present disclosure. In FIG. 3, the quality of service adjusting method 10 based on the application categories is configured to adjust the Quality of Service (QoS) of the communication device 200, and includes performing a network session processing step S1, a packet receiving step S2, a packet analyzing step S3, a list establishing step S4 and a bandwidth distributing step S5.

The network session processing step S1 is performed to drive the hardware accelerator 230 to process the network sessions 110, so that the network sessions 110 pass through the communication device 200. In addition, the network packets 120 of each of the network sessions 110 are grouped into the first packet group 111 and the second packet group 112, and the communication device 200 includes the processing unit 220.

The packet receiving step S2 is performed to drive the processing unit 220 to receive the first packet group 111 of each of the network sessions 110. The second packet group 112 is arranged after the first packet group 111. Furthermore, each of the network packets 120 has a packet datum.

The packet analyzing step S3 is performed to drive the processing unit 220 to execute the packet inspecting module 2131. Then, the packet inspecting module 2131 analyzes the packet data of the first packet group 111 of each of the network sessions 110 and classifies an application corresponding to each of the network sessions 110.

The list establishing step S4 is performed to drive the processing unit 220 to establish the priority list 300 corresponding to the applications.

The bandwidth distributing step S5 is performed to drive the hardware accelerator 230 to distribute the network bandwidth of the communication device 200 to the second packet group 112 of each of the network sessions 110 according to the priority list 300 so as to adjust the QoS of the communication device 200. The second packet group 112 of one of the network sessions 110 corresponding to one of the applications having a higher priority has a larger network bandwidth.

Therefore, the quality of service adjusting method 10 based on the application categories of the present disclosure analyzes the packet data of each of the first packet groups 111 to establish the priority list 300, and adjusts the original packet transmitting rule of the hardware accelerator 230 according to the priority list 300 so as to make good use of the network bandwidth of the communication device 200 and relieve network traffic.

Figure 4:
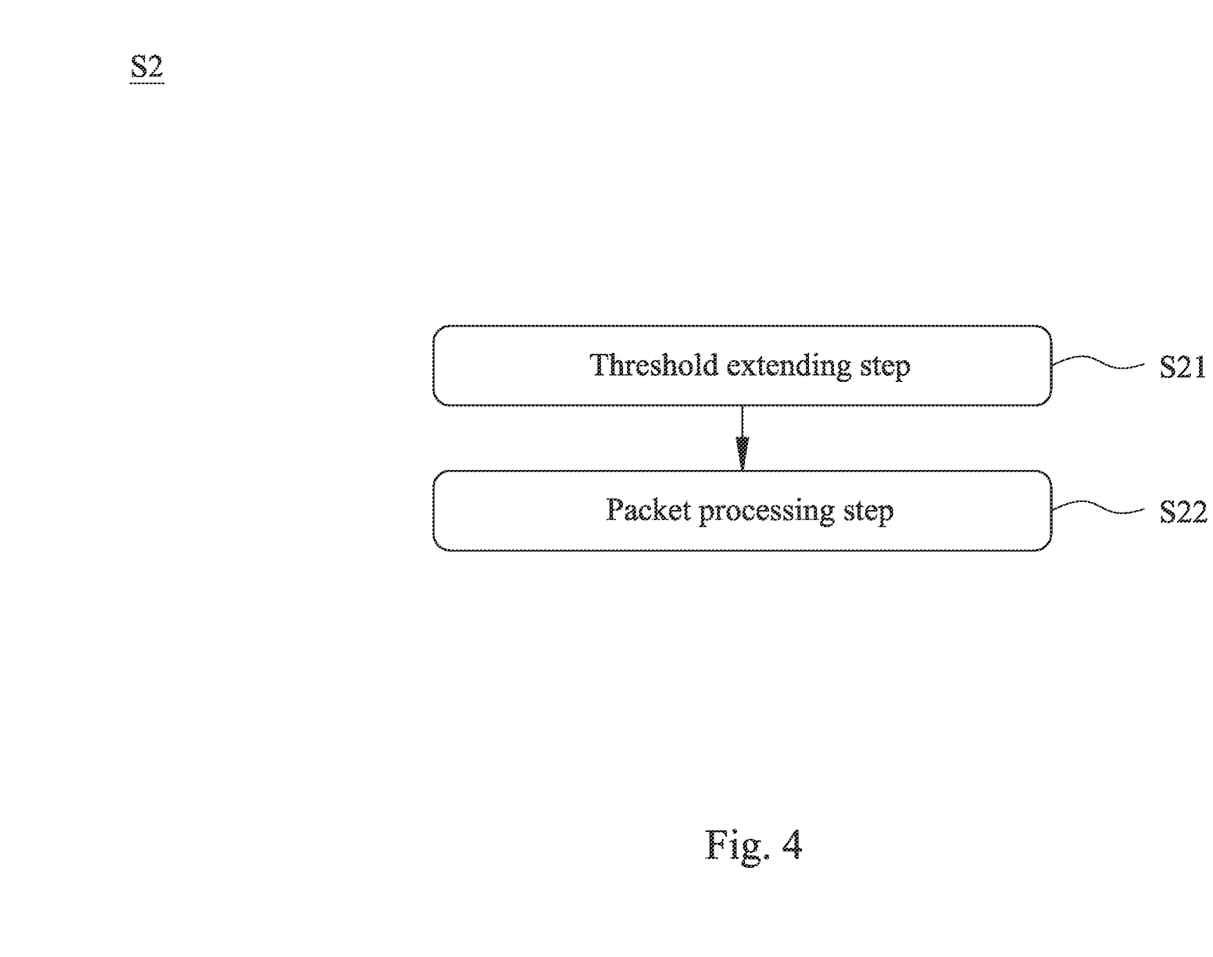
FIG. 4 shows a flow chart of a packet receiving step of FIG. 3.

FIG. 4 shows a flow chart of the packet receiving step S2 of FIG. 3. In FIG. 4, the packet receiving step S2 includes performing a threshold extending step S21 and a packet processing step S22. The threshold extending step S21 is performed to drive the processing unit 220 to execute the threshold adjusting module 2132. The threshold adjusting module 2132 extends a first threshold of the hardware accelerator 230 to generate a second threshold. The packet processing step S22 is performed to drive the processing unit 220 to execute the network device module 2133. The network device module 2133 allows the processing unit 220 to receive the first packet group 111 of each of the network sessions 110 according to the second threshold.

Specifically, the communication device 200 is equipped with the hardware accelerator 230 in order to allow the network packets 120 of each of the network sessions 110 to pass through the communication device 200 more quickly. However, not every one of the network packets 120 passing through the hardware accelerator 230 can pass through the processing unit 220 of the communication device 200. A number of the network packets 120 that can be transmitted to the processing unit 220 are limited by the first threshold. In addition, when a network packet of the prior art passes through a hardware accelerator of the prior art, the hardware accelerator of the prior art only records a source address and a destination address of each of the network sessions. Therefore, the priority levels of the network packets in the hardware accelerator of the prior art are the same before the processing unit 220 of the present disclosure has established the priority list 300 through a connection tracking.

It is worth noting that, the packet inspecting module 2131 classifies the application corresponding to each of the network sessions 110 according to the first packet group 111 corresponding to the second threshold. In detail, when the packet inspecting module 2131 performs a deep packet inspection (DPI), the DPI needs to analyze a sufficient number of the network packets 120 to classify each of the network sessions 110. Therefore, the second threshold conforms to the following equation: $N=X+Y$, wherein $X$ represents an adjustable constant, $Y$ represents the first threshold, and $N$ represents the second threshold. When the threshold adjusting module 2132 adjusts the number of the network packets 120 that is limited to the second threshold (i.e., $N$), the network device module 2133 can allow the processing unit 220 to receive the first to the Nth network packets 120 (that is, the first packet group 111). The N+1th to Mth network packets 120 (that is, the second packet group 112) no longer enter the processing unit 220.

In the packet analyzing step S3, the packet inspecting module 2131 analyzes the packet data of the first packet group 111. Especially, each of the packet data is either a header or a payload. Each of the network packets 120 can include a controlling information and a base datum, wherein the controlling information is the header, and the base datum is the payload. Then, the packet inspecting module 2131 classifies the application corresponding to each of the network session 110 through the header or the payload of the first packet group 111. Specifically, the header can include the source address, the destination address and a protocol port of each of the network sessions 110. The packet inspecting module 2131 can determine which one of the applications belongs to each of the network sessions 110 according to the protocol port. The packet inspecting module 2131 can also determine which one of the applications belongs to each of the network sessions 110 according to application information carried by the load. The communication device 200 uses the source address and the destination address to receive and forward the network packets 120 of each of the network sessions 110. In addition, each of the applications classified can be one of a network voice category (i.e., Voice (VO)), a network stream category (i.e., Video (VI)), a network basic category (i.e., Best Effort (BE)) and a network download category (i.e., Background (BK)), but the present disclosure is not limited thereto. In other embodiments, the memory 210 can store an application database, for example, a look-up table which can store commonly used applications on the market and the corresponding categories. After the packet inspecting module 2131 analyzes the first packet group 111, the packet inspecting module 2131 can directly find the application corresponding to each of the network sessions 110 from the application database and obtain the category of the application.

Figure 5:
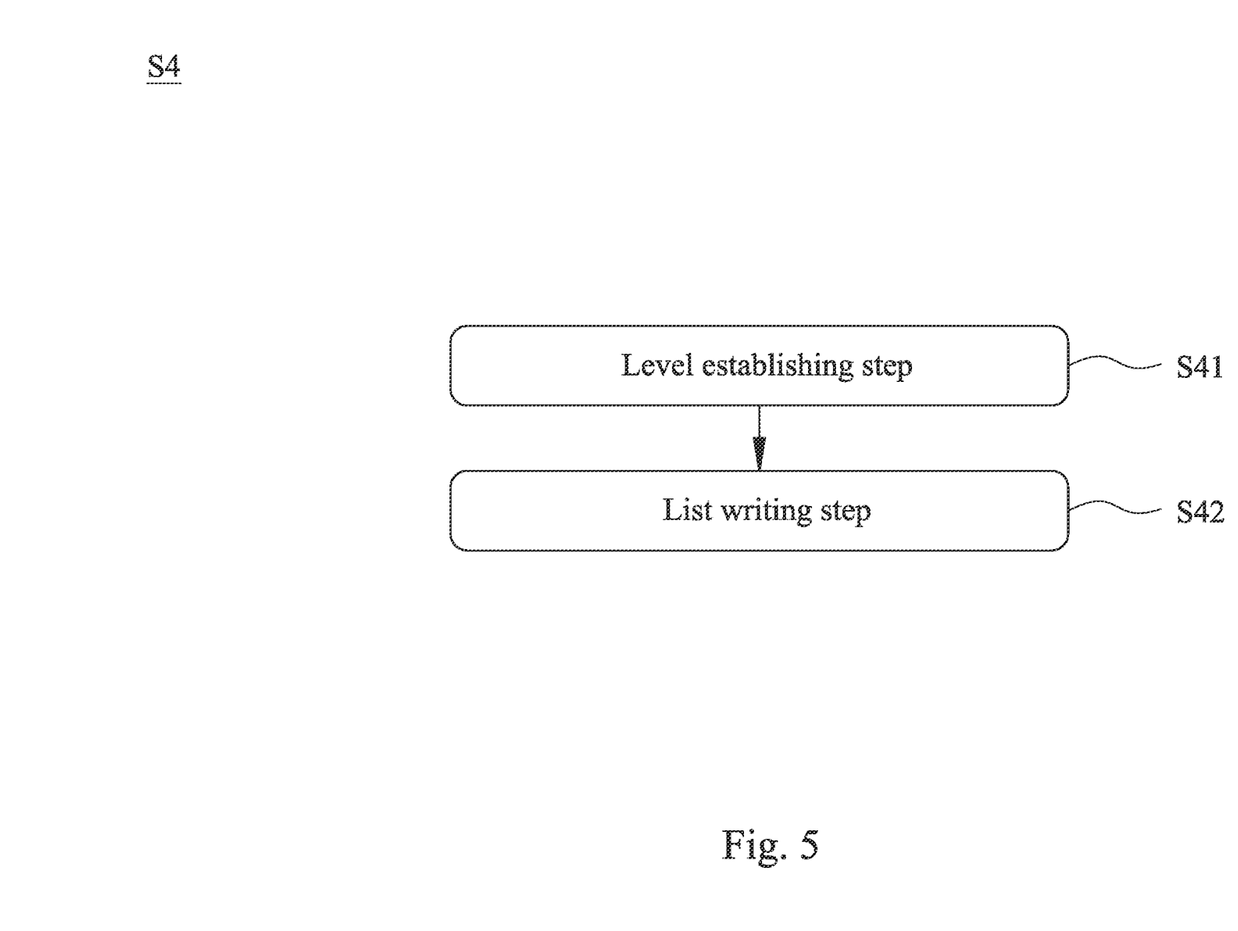
FIG. 5 shows a flow chart of a list establishing step of FIG. 3.
Figure 6:
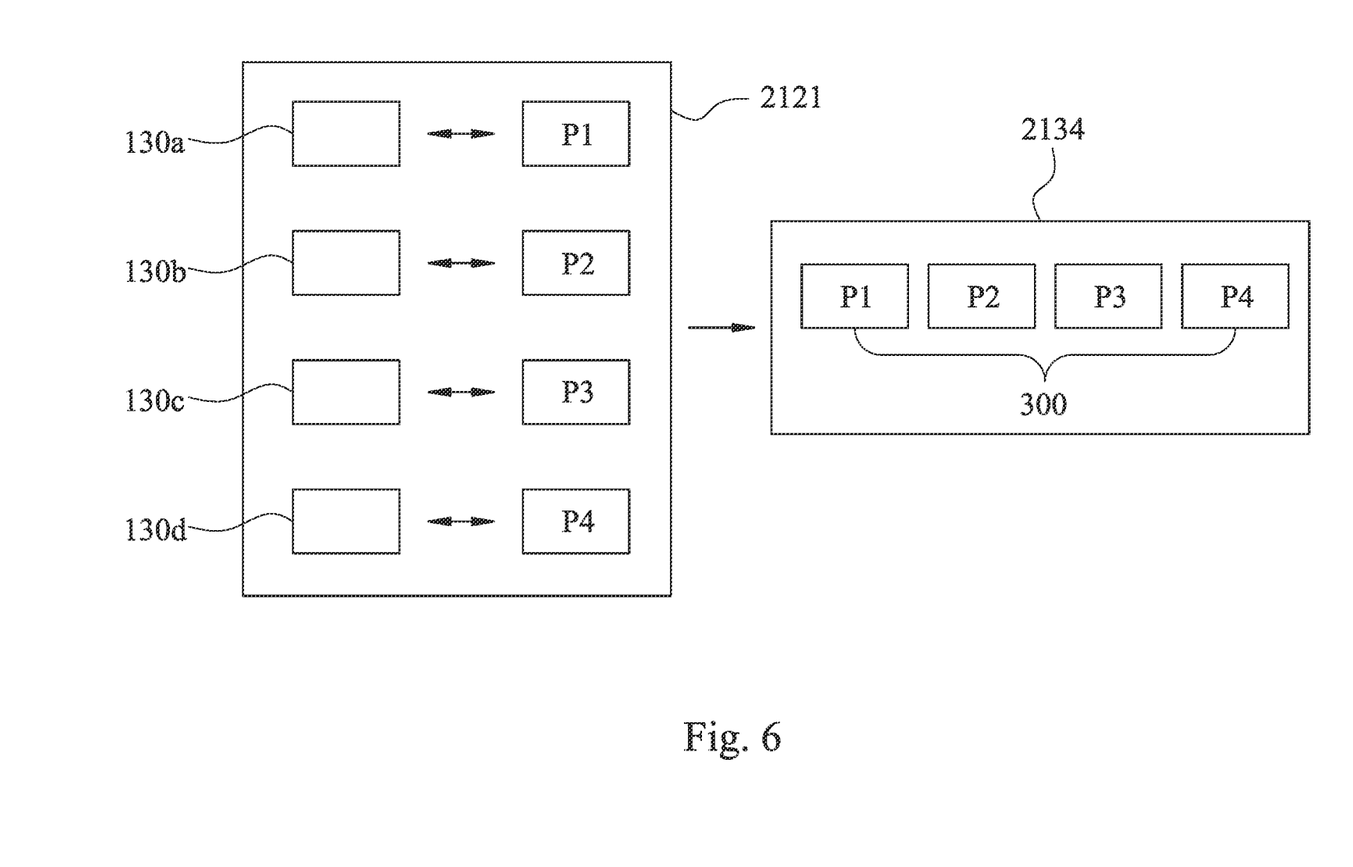
FIG. 6 shows a schematic view of an internet protocol table module and a queuing discipline module of FIG. 1.

Please refer to FIGS. 5 and 6. FIG. 5 shows a flow chart of the list establishing step S4 of FIG. 3. FIG. 6 shows a schematic view of the internet protocol table module 2121 and the queuing discipline module 2134 of FIG. 1. In FIGS. 5 and 6, the list establishing step S4 includes performing a level establishing step S41 and a list writing step S42. The level establishing step S41 is performed to drive the processing unit 220 to execute the internet protocol table module 2121. The internet protocol table module 2121 establishes a plurality of priority levels P1, P2, P3, P4 corresponding to the applications 130a, 130b, 130c, 130d and matches the applications 130a, 130b, 130c, 130d to the priority levels P1, P2, P3, P4. The list writing step S42 is performed to drive the processing unit 220 to execute the queuing discipline module 2134. The queuing discipline module 2134 sorts the priority levels P1, P2, P3, P4 to form the priority list 300, and then writes the priority list 300 into the hardware accelerator 230.

Specifically, the internet protocol table module 2121 sets the priority level P1 to match the application 130a of the network voice category. The Internet protocol table module 2121 sets the priority level P2 to match the application 130b of the network stream category. The internet protocol table module 2121 sets the priority level P3 to match the application 130c of the network basic category. The internet protocol table module 2121 sets the priority level P4 to match the application 130d of the network download category. Furthermore, the internet protocol table module 2121 can be an iptables program, an ip6tables program, an ipchains program or an ipwadm program of the Linux operating system, but the present disclosure is not limited thereto.

Next, the queuing discipline module 2134 sets a rule of the QoS for the priority levels P1, P2, P3, P4 and sorts the priority levels P1, P2, P3, P4 to generate the priority list 300 having the priorities about the priority level P1>the priority level P2>the priority level P3>the priority level P4. Finally, the queuing discipline module 2134 writes the priority list 300 into the hardware accelerator 230. Therefore, the hardware accelerator 230 distributes the network bandwidth of the communication device 200 to the second packet group 112 of each of the network sessions 110 according to the priority list 300. In addition, the queuing discipline module 2134 can be a Queuing discipline (Qdisc) program for Traffic Control (TC) in the Linux operating system, but the present disclosure is not limited thereto.

In detail, the network bandwidth of the communication device 200 can be 100 Mbps. The network session 110 of the network voice category (i.e., the application 130a) can occupy 40% of the network bandwidth (i.e., 40 Mbps). The network session 110 of the network stream category (i.e., the application 130b) can occupy 30% of the network bandwidth (i.e., 30 Mbps). The network session 110 of the network basic category (i.e., the application 130c) can occupy 20% of the network bandwidth (i.e., 20 Mbps). The network session 110 of the network download category (i.e., the application 130d) can occupy 10% of the network bandwidth (i.e., 10 Mbps). Further, when the application 130c of the network basic category does not have a corresponding network session 110 or all of the network packets 120 of the application 130c have been transmitted, the application 130a of the network voice category can preferentially use the network bandwidth idle by the application 130c, and so on.

Figure 7:
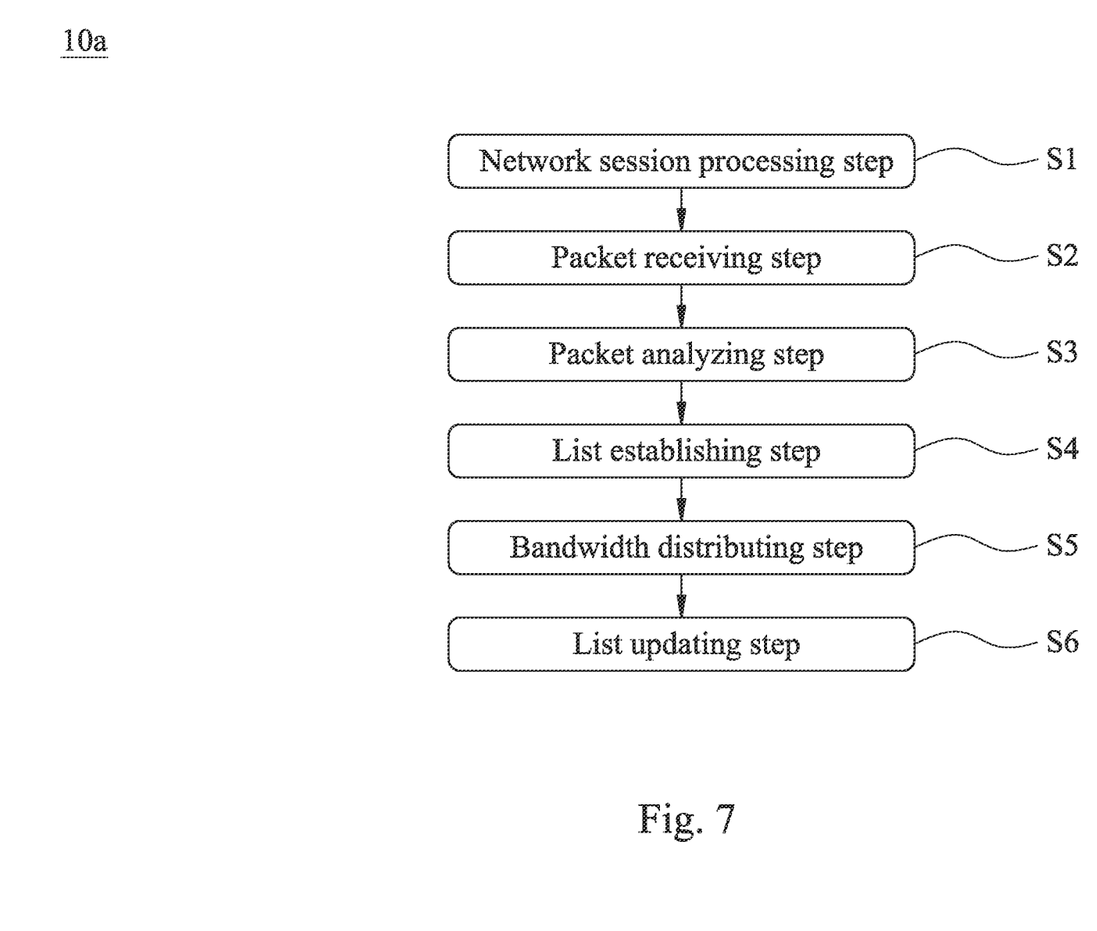
FIG. 7 shows a flow chart of a quality of service adjusting method based on a plurality of application categories according to the 3rd embodiment of the present disclosure.

Please refer to FIGS. 6 and 7, wherein FIG. 7 shows a flow chart of a quality of service adjusting method 10a based on the application categories according to the 3rd embodiment of the present disclosure. In FIG. 7, the quality of service adjusting method 10a based on the application categories can further include performing a list updating step S6. The list updating step S6 is performed to drive the processing unit 220 to re-execute the packet receiving step S2, the packet analyzing step S3 and the list establishing step S4 after a predetermined time, and update the priority list 300, wherein the packet receiving step S2, the packet analyzing step S3 and the list establishing step S4 in FIG. 7 are the same as the corresponding steps in FIG. 3, and will not be detailedly described herein. It is worth noting that, users can set 10 minutes or a time interval as the aforementioned predetermined time; or, when users need to re-analyze all of the network sessions 110 in the communication device 200, the processing unit 220 can flexibly adjust a sequence of the priority levels P1, P2, P3, P4 to update the priority list 300 so as to dynamically detect the current network status of the communication device 200 and immediately enable the application 130a having a high demand to obtain a high priority to use the network bandwidth.

In summary, the present disclosure has the following advantages: First, it is favorable for extending the limited number of the network packets that enter the communication device from the hardware accelerator. Second, it is favorable for analyzing the header or the payload of the network packets to classify the network sessions, and distributing the network bandwidth according to the applications corresponding to the network sessions. Third, it is favorable for enabling the application having a high demand to obtain a high priority to use the network bandwidth by creating the priority list so as to adjust the QoS of the communication device.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A quality of service adjusting method based on a plurality of application categories, which is configured to adjust a Quality of Service (QoS) of a communication device, the quality of service adjusting method based on the application categories comprising:
performing a network session processing step to drive a hardware accelerator to process a plurality of network sessions, so that the network sessions passing through the communication device, wherein a plurality of network packets of each of the network sessions are grouped into a first packet group and a second packet group, and the communication device comprises a processing unit;
performing a packet receiving step to drive the processing unit to receive the first packet group of each of the network sessions, wherein the second packet group is arranged after the first packet group, and each of the network packets has a packet datum;

performing a packet analyzing step to drive the processing unit to execute a packet inspecting module, wherein the packet inspecting module analyzes a plurality of the packet data of the first packet group of each of the network sessions and classifies an application corresponding to each of the network sessions;

performing a list establishing step to drive the processing unit to establish a priority list corresponding to a plurality of the applications; and performing a bandwidth distributing step to drive the hardware accelerator to distribute a network bandwidth of the communication device to the second packet group of each of the network sessions according to the priority list so as to adjust the QoS of the communication device;

wherein the second packet group of one of the network sessions corresponding to one of the applications having a higher priority has a larger network bandwidth.

2. The quality of service adjusting method based on the plurality of application categories of claim 1, further comprising:

performing a list updating step to drive the processing unit to re-execute the packet receiving step, the packet analyzing step and the list establishing step after a predetermined time, and update the priority list.

3. The quality of service adjusting method based on the plurality of application categories of claim 1, wherein the packet receiving step comprises:

performing a threshold extending step to drive the processing unit to execute a threshold adjusting module, wherein the threshold adjusting module extends a first threshold of the hardware accelerator to generate a second threshold; and performing a packet processing step to drive the processing unit to execute a network device module, wherein the network device module allows the processing unit to receive the first packet group of each of the network sessions according to the second threshold.

4. The quality of service adjusting method based on the plurality of application categories of claim 3, wherein the packet inspecting module classifies the application corresponding to each of the network sessions according to the first packet group corresponding to the second threshold, and the second threshold conforms to the following equation:

$$N=X+Y;$$

wherein X represents an adjustable constant, Y represents the first threshold, and N represents the second threshold.

5. The quality of service adjusting method based on the plurality of application categories of claim 1, wherein the list establishing step comprises:

performing a level establishing step to drive the processing unit to execute an Internet protocol table module, wherein the internet protocol table module establishes a plurality of priority levels corresponding to the applications and matches the applications to the priority levels; and performing a list writing step to drive the processing unit to execute a queuing discipline module, wherein the queuing discipline module sorts the priority levels to form the priority list, and then writes the priority list into the hardware accelerator.

6. The quality of service adjusting method based on the plurality of application categories of claim 5, wherein the processing unit is configured to execute an operating system program, the operating system program comprises a user software module and a kernel software module, and the processing unit executes the internet protocol table module in the user software module and executes the queuing discipline module in the kernel software module.

7. The quality of service adjusting method based on the plurality of application categories of claim 1, wherein each of the applications is one of a network voice category, a network stream category, a network basic category and a network download category.

8. The quality of service adjusting method based on the plurality of application categories of claim 1, wherein each of the packet data is either a header or a payload.

9. A quality of service adjusting system based on a plurality of application categories, which is configured to adjust a Quality of Service (QoS) of a communication device, the quality of service adjusting system based on the application categories comprising:

the communication device receiving a plurality of network sessions, wherein a plurality of network packets of each of the network sessions are grouped into a first packet group and a second packet group, and the communication device comprises:

a memory configured to access a packet inspecting module;

a processing unit electrically connected to the memory, wherein the processing unit is configured to implement a quality of service adjusting method based on the application categories comprising:

performing a packet receiving step to drive the processing unit to receive the first packet group of each of the network sessions, wherein the second packet group is arranged after the first packet group, and each of the network packets has a packet datum;

performing a packet analyzing step to drive the processing unit to execute the packet inspecting module, wherein the packet inspecting module analyzes a plurality of the packet data of the first packet group of each of the network sessions and classifies an application corresponding to each of the network sessions; and performing a list establishing step to drive the processing unit to establish a priority list corresponding to a plurality of the applications; and a hardware accelerator electrically connected to the processing unit and processes the network sessions, so that the network sessions passing through the communication device, wherein the hardware accelerator distributes a network bandwidth of the communication device to the second packet group of each of the network sessions according to the priority list so as to adjust the QoS of the communication device;

wherein the second packet group of one of the network sessions corresponding to one of the applications having a higher priority has a larger network bandwidth.

10. The quality of service adjusting system based on the plurality of application categories of claim 9, wherein the processing unit re-executes the packet receiving step, the packet analyzing step and the list establishing step after a predetermined time, and updates the priority list.

11. The quality of service adjusting system based on the plurality of application categories of claim 9, wherein the memory is configured to access a threshold adjusting module and a network device module, and the packet receiving step comprises:

performing a threshold extending step to drive the processing unit to execute the threshold adjusting module, wherein the threshold adjusting module extends a first threshold of the hardware accelerator to generate a second threshold; and performing a packet processing step to drive the processing unit to execute the network device module, wherein the network device module allows the processing unit to receive the first packet group of each of the network sessions according to the second threshold.

12. The quality of service adjusting system based on the plurality of application categories of claim 11, wherein the packet inspecting module classifies the application corresponding to each of the network sessions according to the first packet group corresponding to the second threshold, and the second threshold conforms to the following equation:

$$N=X+Y;$$

wherein X represents an adjustable constant, Y represents the first threshold, and N represents the second threshold.

13. The quality of service adjusting system based on the plurality of application categories of claim 9, wherein the memory is configured to access an internet protocol table module and a queuing discipline module, and the list establishing step comprises:

performing a level establishing step to drive the processing unit to execute the internet protocol table module, wherein the internet protocol table module establishes a plurality of priority levels corresponding to the applications and matches the applications to the priority levels; and performing a list writing step to drive the processing unit to execute the queuing discipline module, wherein the queuing discipline module sorts the priority levels to form the priority list, and then writes the priority list into the hardware accelerator.

14. The quality of service adjusting system based on the plurality of application categories of claim 13, wherein the processing unit is configured to execute an operating system program, the operating system program comprises a user software module and a kernel software module, and the processing unit executes the internet protocol table module in the user software module and executes the queuing discipline module in the kernel software module.

15. The quality of service adjusting system based on the plurality of application categories of claim 9, wherein each of the applications is one of a network voice category, a network stream category, a network basic category, and a network download category.

16. The quality of service adjusting system based on the plurality of application categories of claim 9, wherein each of the packet data is either a header or a payload.

* * * * *